No. 696,369. Patented Mar. 25, 1902.
E. KEMPSHALL.
GOLF BALL.
(Application filed Feb. 1, 1902.)
(No Model.)

Witnesses:
Robert Head
F. E. Maynard

Inventor:
Eleazer Kempshall,
By his Attorney
F. H. Richards.

UNITED STATES PATENT OFFICE.

ELEAZER KEMPSHALL, OF BOSTON, MASSACHUSETTS, ASSIGNOR TO THE KEMPSHALL MANUFACTURING COMPANY, A CORPORATION OF NEW JERSEY.

GOLF-BALL.

SPECIFICATION forming part of Letters Patent No. 696,369, dated March 25, 1902.

Application filed February 1, 1902. Serial No. 92,225. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in Golf-Balls, of which the following is a specification.

This invention relates to golf-balls composed chiefly of gutta-percha and soft rubber; and its object is to combine the several elements in such proportions as to produce an efficient ball having the quality of being "dead" when given a light blow and exceedingly lively when struck a heavy blow.

Figure 1:
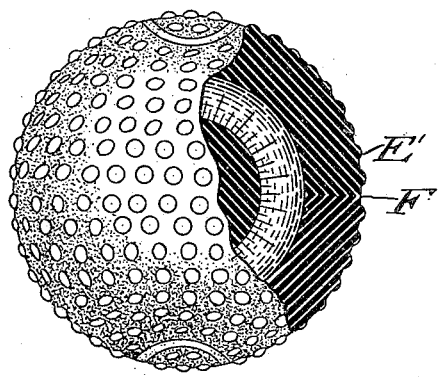
Figure 2:
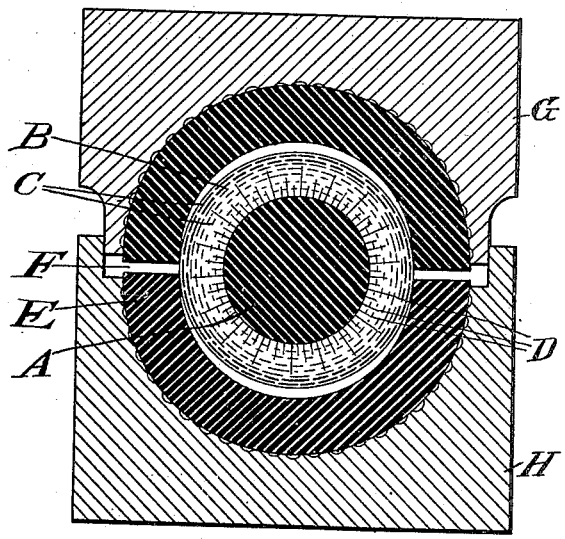

In the drawings forming a part of this specification, Figure 1 is a view of a ball made according to my improvements, being partly broken away so as to exhibit its construction. Fig. 2 illustrates a stage in the process of completing the ball.

I preferably employ a small core A, made of gutta-percha, which is preferably introduced while in a fluent condition and then hardened within a rubber envelop B of medium thickness, the gutta-percha being forced into said envelop to such an extent as to materially expand said envelop, as set forth in an application filed by Francis H. Richards, December 3, 1901, Serial No. 84,529, whereby the envelop, especially the exterior portion thereof, is put into a state of high longitudinal tension, as indicated by the broken curved lines C, the interior portion of the envelop is compressed by the exterior portion, as indicated by the radial lines D, and the core is held constantly under compression by said envelop. The combination of compressed core and distended envelop enhances the efficiency of the ball when struck a heavy blow.

Upon the compound rubber and gutta-percha filling I place a very thick shell E, of gutta-percha, preferably in the form of hollow hemispheres, the joint between them being indicated at F. The parts thus assembled I place between heating and pressing dies G and H. I then heat the dies and bring them together with great force. The heat softens the gutta-percha shell and enables it to weld at the joint F. I thus form a shell E' upon the rubber and gutta-percha filling which possesses great strength and durability. The pressure of the dies compacts and solidifies the shell, the confined mass of rubber and gutta-percha being sufficiently resisting to support the comparatively weak material of the shell under any desired degree of pressure of the forming-dies. The pressure is maintained while the shell cools and hardens, so that the latter firmly grips the core. It is to be understood that in case condensation of the bulk of the core A or of the spherical rubber envelop B takes place it is due to the presence of air-spaces or impurities in the material. It is not essential that either said core or said soft envelop be always condensed in bulk so long as the core, envelop, and shell have the relation and proportions substantially as set forth herein.

I use in the shell a large mass of gutta-percha which possesses to a superlative degree the quality of storing up force from a blow, which is necessary in a golf-ball. It will be understood that it is important, in view of the small size of the ball used in this game and the necessity of carrying or flying a great distance, to use in its construction such a combination of materials as will utilize to advantage every portion of the mass of the ball, or, in other words, it is important to eliminate all dead-weight therefrom. Hence it is desirable not only to provide a core or filling having the desired qualities, but also to provide therefor a shell which not only protects said filling but also itself contributes in a large degree to the flying power or efficiency of the ball, while preventing a light blow from affecting the highly-elastic interior.

By making the hard core A of small diameter, the thickness of the rubber envelop substantially between ten and fifteen (preferably twelve and one-half) per cent. of the diameter of the ball, and the thickness of the gutta-percha shell between twelve and twenty (preferably sixteen) per cent. of the ball-diameter I produce a ball exceedingly efficient and well adapted to meet the various requirements of the game of golf. It is not essential in all cases that the core A be gutta-percha nor that the rubber envelop be in a state of distension.

Having described my invention, I claim—

1. A playing-ball comprising a hard core, a spherical soft-rubber envelop thereon whose thickness is substantially between ten and fifteen per cent. of the diameter of the entire ball, and a gutta-percha shell incasing said envelop, the thickness of said shell being substantially between twelve and twenty per cent. of the diameter of the ball.

2. A playing-ball comprising a hard core, a spherical soft-rubber envelop thereon whose thickness is substantially twelve and one-half per cent. of the diameter of the entire ball, and a gutta-percha shell incasing said envelop, the thickness of said shell being substantially sixteen per cent. of the diameter of the ball.

3. A playing-ball comprising a gutta-percha core, a spherical soft-rubber envelop thereon whose thickness is substantially between ten and fifteen per cent. of the diameter of the entire ball, and a gutta-percha shell incasing said envelop, the thickness of said shell being substantially between twelve and twenty per cent. of the diameter of the ball.

4. A playing-ball comprising a gutta-percha core, a spherical soft-rubber envelop distended thereon whose thickness is substantially between ten and fifteen per cent. of the diameter of the entire ball, and a gutta-percha shell incasing said envelop, the thickness of said shell being substantially between twelve and twenty per cent. of the diameter of the ball.

5. A playing-ball comprising a hard core, a spherical soft-rubber envelop distended thereon whose thickness is substantially between ten and fifteen per cent. of the diameter of the entire ball and a gutta-percha shell compressed upon said envelop, the thickness of said shell being substantially between twelve and twenty per cent. of the diameter of the ball.

6. A playing-ball comprising a hard core, a spherical soft-rubber envelop thereon whose thickness is substantially between ten and fifteen per cent. of the diameter of the entire ball, and a gutta-percha shell compressed and welded upon said envelop, the thickness of said shell being substantially between twelve and twenty per cent. of the diameter of the ball.

ELEAZER KEMPSHALL.

Witnesses:
   B. C. STICKNEY,
   JOHN O. SEIFERT.